United States Patent
Schiedermeier

(10) Patent No.: US 11,348,736 B2
(45) Date of Patent: May 31, 2022

(54) DC-LINK CAPACITOR FOR A VEHICLE DRIVEN BY AN ELECTRIC MOTOR

(71) Applicant: AUDI AG, Ingolstadt (DE)

(72) Inventor: Maximilian Schiedermeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 720 days.

(21) Appl. No.: 16/360,276

(22) Filed: Mar. 21, 2019

(65) Prior Publication Data
US 2019/0295776 A1    Sep. 26, 2019

(30) Foreign Application Priority Data
Mar. 22, 2018   (DE) .......................... 102018204382.5

(51) Int. Cl.
| | |
|---|---|
| *H01G 4/40* | (2006.01) |
| *H01G 4/012* | (2006.01) |
| *H01G 4/224* | (2006.01) |
| *H01G 4/32* | (2006.01) |
| *B60L 3/00* | (2019.01) |
| *B60L 3/04* | (2006.01) |
| *H01G 11/82* | (2013.01) |

(52) U.S. Cl.
CPC ................ *H01G 4/40* (2013.01); *B60L 3/003* (2013.01); *B60L 3/04* (2013.01); *H01G 4/012* (2013.01); *H01G 4/224* (2013.01); *H01G 4/32* (2013.01); *H01G 11/82* (2013.01)

(58) Field of Classification Search
CPC .......... H01G 4/40; H01G 4/012; H01G 4/224; H01G 4/32; H01G 11/82
See application file for complete search history.

(56) References Cited

U.S. PATENT DOCUMENTS

| | | | | |
|---|---|---|---|---|
| 2007/0114077 | A1* | 5/2007 | Goetz | B60L 3/0069 180/54.1 |
| 2010/0321889 | A1* | 12/2010 | Yoshino | H05K 7/20927 361/702 |
| 2011/0241581 | A1 | 10/2011 | Flock et al. | |
| 2014/0286064 | A1 | 9/2014 | Kamizuma et al. | |
| 2016/0258717 | A1* | 9/2016 | Stone | G06F 3/04817 |
| 2019/0067969 | A1 | 2/2019 | Blum et al. | |

FOREIGN PATENT DOCUMENTS

| | | |
|---|---|---|
| CN | 101223056 A | 7/2008 |
| CN | 106469799 A | 3/2017 |
| DE | 69901244 T2 | 10/2002 |
| DE | 102008061585 A1 | 6/2010 |
| DE | 102012214368 A1 | 2/2014 |
| DE | 102012020019 A1 | 4/2014 |
| DE | 102013215581 A1 | 2/2015 |

(Continued)

OTHER PUBLICATIONS

German Examination Report dated Feb. 19, 2019 in corresponding German Application No. 102018204382.5; 20 pages.

(Continued)

*Primary Examiner* — Hoa C Nguyen
(74) *Attorney, Agent, or Firm* — Maier & Maier, PLLC

(57) ABSTRACT

A DC link capacitor for a vehicle driven by an electric motor, assembly with a DC link capacitor and a vehicle driven by an electric motor with such an assembly.

15 Claims, 1 Drawing Sheet

(56) References Cited

FOREIGN PATENT DOCUMENTS

| | | |
|---|---|---|
| DE | 102015217287 A1 | 3/2017 |
| DE | 10 2016 203172 A1 | 8/2017 |
| JP | 2008-97991 A | 4/2008 |
| WO | 2011/018434 A2 | 2/2011 |
| WO | 2015/082193 A2 | 6/2015 |
| WO | 2017/191135 A2 | 11/2017 |

OTHER PUBLICATIONS

Chinese Office Action dated Jan. 6, 2021, in connection with corresponding CN Application No. 201910216261.X (15 pp., including machine-generated English translation).

European Search Report dated Jul. 25, 2019, in corresponding European patent application No. 19161472.6 including partial machine-generated English language translation; 10 pages.

* cited by examiner

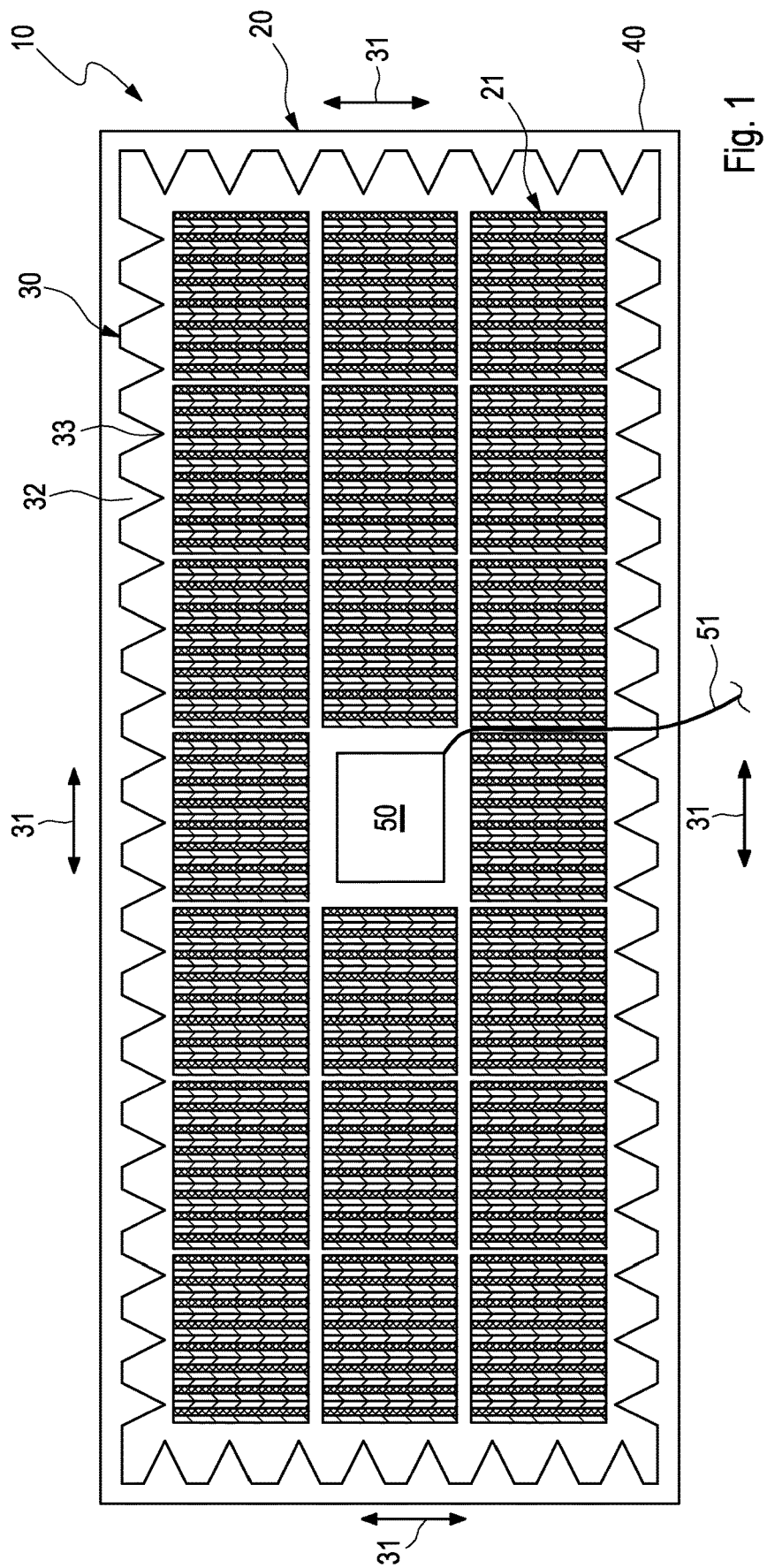
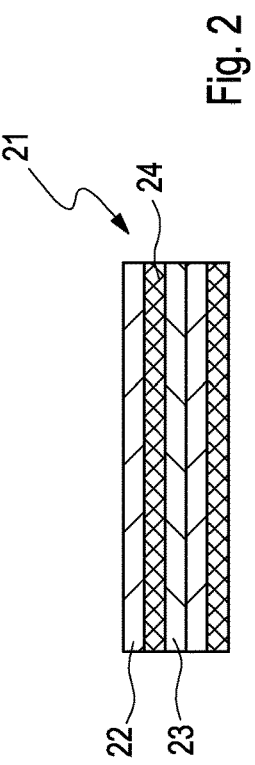

DC-LINK CAPACITOR FOR A VEHICLE DRIVEN BY AN ELECTRIC MOTOR

FIELD

The disclosure relates to a DC link capacitor for a vehicle driven by an electric motor. Furthermore, the invention relates to an assembly with a DC link capacitor and a vehicle driven by an electric motor with such an assembly.

BACKGROUND

Vehicles driven by an electric motor, such as electric vehicles or hybrid vehicles, usually have a high-voltage network, which comprises a high-voltage battery system acting as an energy storage device, power electronics, an electric motor, other high-voltage components and a high-voltage bus system connecting all components.

As the high-voltage battery system supplies a DC voltage and the electric motor is usually embodied as a three-phase machine driven by an AC current, the high-voltage network further comprises at least one intermediate circuit acting as an inverter with so-called DC link capacitors in order to transform the DC voltage into an AC voltage (propulsion) or vice versa (recuperation).

DC link capacitors can, however, also be provided for high-voltage components which are operated with a direct current, for example a charging device, a temperature control device for a coolant or the passenger compartment or a transformer for supplying the 12V on-board power supply. In these cases, a DC link capacitor serves to support the DC voltage applied to the assigned high-voltage component and to absorb voltage peaks, i.e. to act as a filter.

Like vehicles with an exclusive internal combustion engine, vehicles driven by an electric motor must meet strict safety requirements in order to protect occupants in the passenger compartment of the vehicle in the event of an accident to the greatest possible extent. In particular, as is common practice, accident-induced deformation of the passenger compartment must always be prevented to the greatest possible extent by means of constructive measures. Conformity with these requirements must be demonstrated in special and standardized crash tests for road safety approval of the vehicle.

In contrast to vehicles with an exclusive internal combustion engine, however, the high-voltage network of a vehicle driven by an electric motor poses an additional risk in the event of an accident for the occupants of the vehicle in the passenger compartment or for persons present at the scene of the accident outside the vehicle. Accordingly, road safety requirements demand that the high-voltage network of the vehicle driven by an electric motor should be as voltage-free as possible after an accident. One possibility is to discharge the high-voltage battery system.

Thus DE 10 2013 215 581 A1 discloses a battery system with a housing, at least one battery cell, a discharge switch and a discharge resistor, all of which are arranged in the housing of the battery system. The discharge switch can be operated from the outside and, in a discharge position, causes a discharge current to flow through the discharge resistor, through which at least one battery cell is discharged. In this way, the battery cell can be discharged after an accident, for example, by manually operating the discharge switch.

In contrast, DE 10 2012 214 368 A1 discloses a discharge module for a battery system of a vehicle driven by an electric motor. The discharge module comprises a discharge switch which is closed in response to an accident signal to discharge a battery cell of the battery system by discharging a discharge current. With this discharge module, the battery system is therefore discharged automatically when the discharge switch receives an accident signal generated by appropriate sensors.

However, these two solutions do not take into account any high-voltage charge states of DC link capacitors installed in the vehicle at the time of the accident. These can store a certain amount of charge and, when the battery system is discharged, act on their own as a high-voltage source which, after an accident, poses a danger to the occupants of the vehicle or persons outside the vehicle. The safety of a vehicle driven by an electric motor can therefore be further increased if in addition the installed DC link capacitors are discharged in the event of an accident.

DE 10 2012 020 019 A1 discloses a corresponding discharge module with a discharge circuit for the active discharge of a DC link capacitor which is assigned to a high-voltage component of a vehicle driven by an electric motor. To ensure safe discharge of the DC link capacitor even in an unsafe operating state of the vehicle, such as following an accident, the discharge module is embodied separately from a power electronic module assigned to the high-voltage component and integrated into the high-voltage component.

Although the high-voltage component can protect the integrated discharge module from a deformation impairing its function, with this solution the required connecting line between the discharge module and the DC link capacitor can be severed due to accidental deformations, thus preventing discharge of the DC link capacitor.

SUMMARY

The disclosure is therefore based on the task of providing an improved DC link capacitor which ensures safe discharge in the event of an accident. Furthermore, the task of the invention is to create an assembly with a DC link capacitor and a vehicle driven by an electric motor with such an assembly.

The object of the invention is a DC link capacitor for a vehicle driven by an electric motor. The DC link capacitor may be associated with an electric motor or other high-voltage component of the vehicle to provide an AC voltage to the electric motor as part of an inverter, or a DC voltage to charge the high-voltage battery system during recuperation, or to support a DC voltage applied to the high-voltage component.

The interior of the DC link capacitor according to the invention has a receptacle for a discharge module of a high-voltage component of the vehicle. The DC link capacitor can thus protect, like an armor, a discharge module located in the receptacle from accidental deformation and enable the discharge module to function as intended even after an accident.

In one embodiment, the DC link capacitor comprises several foil coils, which are arranged side by side in a grid structure omitting an inner grid space, and the receptacle is formed by the cavity created by the omission. In other words, in a regular two- or three-dimensional arrangement of the foil coils, a central space remains free, which can serve as a receptacle for the discharge module. A discharge module arranged in the receptacle is thus surrounded by the foil coils of the DC link capacitor which in turn protect it from deformation.

In a preferred embodiment, the DC link capacitor comprises a foil coil-enclosing jacketing with several inwardly extending projections comprising an electrically conductive material or consisting of an electrically conductive material. A foil coil comprises a positive electrode and a negative electrode and a dielectric arranged between the positive electrode and the negative electrode which electrically insulates the two electrodes from each other. The electrically conductive projections penetrate into the adjacent foil coils in the event of an accidental deformation of the jacketing of the DC link capacitor and thus cause a short circuit of the two electrodes of the foil coils. The short-circuited foil coils are discharged almost instantaneously by the short-circuit current.

In advantageous embodiments, the projections are arranged equidistantly along a circumferential direction of the jacketing. In such an arrangement, the jacketing can develop its intended effect in any direction of deformation. Accordingly, the DC link capacitor can be mounted in the vehicle with any orientation in relation to a predominant or most probable deformation direction.

In other embodiments, one and preferably each projection has a tip at its inner end and, in particular, has a triangularly shaped cross-section of one projection and preferably each projection parallel to the respective direction of extension. Pointed projections require little force to penetrate into the foil coil. If the jacketing is produced by pressing a sheet metal, projections with a triangular cross-section in the direction of extension are particularly easy to provide. One possibility is to form cone-shaped projections. Alternatively, the projections can also be provided as elongated V-shaped structures extending parallel to each other.

The DC link capacitor advantageously comprises a housing which encloses the jacketing and in particular comprises electrically conductive material or an electrically insulating material. The housing can provide smooth outer surfaces of the DC link capacitor. Depending on the installation situation, it may be advantageous to electrically isolate the interior of the DC link capacitor from or conductively connect it to its installation environment. In the latter case, both the positive electrodes and the negative electrodes of the foil coils of the DC link capacitors are additionally short-circuited with the chassis and/or the vehicle body, which form an electrical ground of the vehicle, as a result of penetration of the projections into the foil coils, in order to exclude potential differences between the DC link capacitor and further vehicle components.

The object of the invention is also an assembly for a vehicle driven by an electric motor, with a DC link capacitor according to the invention and a discharge module, which is arranged in the receptacle of the DC link capacitor. The constructive integration of the discharge module into the DC link capacitor results in a compact assembly which can effectively protect the discharge module from accidental deformations.

In further embodiments, the discharge module comprises a printed circuit board, a discharge resistor fixed on the printed circuit board and/or a discharge switch fixed on the printed circuit board, which is embodied in particular as an electrical switch, as a mechanical switch or as an electromechanical switch. The discharge switch and the discharge resistor are connected in series and electrically connected to the positive electrodes and the negative electrodes of the foil coils of the DC link capacitor. For the discharge switch, alternative embodiments can also be used in addition to those mentioned.

In a preferred embodiment, the discharge module comprises a control line which extends from the discharge module to an outside of the DC link capacitor and is arranged in particular between two adjacent foil coils of the DC link capacitor. In the case of an electrical switch without moving parts or an electromechanical switch, for example a relay, the switching signal required to set the discharge switch to a discharge state or a discharge position is provided via a control line which extends from the outside through spaces between the foil coils to the discharge module.

A further object of the invention is a vehicle driven by an electric motor, in particular a hybrid or electric vehicle, which comprises an assembly according to the invention. Vehicles driven by an electric motor, whose DC link capacitors are provided with a discharge module in the form of the assembly described above, have a particularly high discharge safety of the DC link capacitors in the event of an accident. The discharge module can either remain intact in the event of an accident and discharge the DC link capacitor as intended. However, even if the DC link capacitor and with it the discharge module arranged in the receptacle are deformed such as to be inoperable, the projections of the jacketing penetrating into the foil coils ensure reliable discharge of the DC link capacitor.

BRIEF DESCRIPTION OF THE DRAWINGS

The invention is represented schematically in the drawings by means of one embodiment and is described further with reference to the drawings. They show:

FIG. 1 a schematic cross-sectional view of an embodiment of an assembly according to the invention;

FIG. 2 a schematic cross-sectional view of an enlarged detail of a foil coil of a DC link capacitor.

DETAILED DESCRIPTION

FIG. 1 shows a schematic cross-sectional view of an embodiment of an assembly 10 according to the invention for a vehicle driven by an electric motor. Accordingly, a vehicle driven by an electric motor, such as a hybrid vehicle or an electric vehicle, may comprise such an assembly 10. The assembly 10 can be assigned as part of an inverter to an electric motor of the vehicle or on its own to another high-voltage component of the vehicle.

The assembly 10 comprises a DC link capacitor 20, which has in its interior a receptacle 25 for a discharge module 50 of the vehicle. The DC link capacitor 20 comprises several foil coils 21.

FIG. 2 shows a schematic cross-sectional view of an enlarged detail of a foil coil 21 of a DC link capacitor 20. The foil coil 21 has a multilayer structure with a positive electrode 22, a negative electrode 23 and a dielectric 24 arranged between the positive electrode 22 and the negative electrode 23 and electrically insulating the two electrodes 22, 23 of the foil coil from each other to provide a capacitor function.

Returning to FIG. 1, the foil coils 21 are arranged side by side in a grid structure omitting an inner grid space. The receptacle 25 is formed by the cavity created by the omission.

Further, the DC link capacitor 20 comprises a jacketing 30 enclosing the foil coil 21 with several inwardly extending projections 32 comprising an electrically conductive material or consisting of an electrically conductive material. The projections 32 are arranged equidistantly along a circumferential direction 31 of the jacketing 30. Each projection 32 has a tip 33 at its inner end. A cross-section parallel to the direction of extension of each projection 32 has a triangular shape.

The DC link capacitor 20 also comprises a housing 40 which encloses the jacketing 30 and, depending on the installation situation, comprises electrically conductive material or electrically insulating material.

The assembly 10 also comprises a discharge module 50, which is arranged in the receptacle 25 of the DC link capacitor 20. The discharge module 50 comprises a printed circuit board, a discharge resistor fixed on the printed circuit board and/or a discharge switch fixed on the printed circuit board, which is embodied as an electrical switch, as a mechanical switch or as an electromechanical switch.

In addition, the discharge module 50 comprises a control line 51 which extends from the discharge module 50 to an outside of the DC link capacitor 20 and is arranged between two adjacent foil coils 21 of the DC link capacitor 20.

An advantage of the DC link capacitor according to the invention is that it can accommodate a discharge module assigned to it in its interior in order to protect it from accidental deformations and to guarantee the intended function of the discharge module with a high probability after an accident. A further advantage can be seen in the fact that the DC link capacitor according to the invention can be combined with a discharge module assigned to it to form a very compact assembly. This requires only a small installation space and is very light in weight. In addition, the assembly can also be positioned in areas of the vehicle that are exposed to strong deformation forces in the event of an accident, resulting in increased constructive freedom. Apart from this, no electrical connection lines to the discharge unit running outside the DC link capacitor are required which could be damaged or cut as a result of an accident.

The invention claimed is:

1. A DC link capacitor for a vehicle driven by an electric motor, comprising:
   a receptacle in an interior for a discharge module of a high-voltage component of the vehicle, and
   several foil coils, which are arranged side by side in a grid structure omitting an inner grid space,
   wherein the receptacle is delimited by a cavity formed in the inner grid space.

2. The DC link capacitor of claim 1, further comprising:
   a jacketing enclosing the foil coils with several inwardly extending projections comprising an electrically conductive material.

3. The DC link capacitor of claim 2, wherein the projections are equidistantly arranged along a circumferential direction of the jacketing.

4. The DC link capacitor of claim 3, wherein each of the inwardly extending projections is provided with a pointed tip.

5. The DC link capacitor of claim 4, further comprising:
   a housing which encloses the jacketing.

6. An assembly for a vehicle driven by an electric motor, comprising:
   the DC link capacitor of claim 4, and
   a discharge module which is arranged in the receptacle of the DC link capacitor.

7. The DC link capacitor of claim 3, further comprising:
   a housing which encloses the jacketing.

8. An assembly for a vehicle driven by an electric motor, comprising:
   the DC link capacitor of claim 3 and,
   a discharge module which is arranged in the receptacle of the DC link capacitor.

9. The DC link capacitor of claim 2, further comprising:
   a housing which encloses the jacketing.

10. An assembly for a vehicle driven by an electric motor, comprising:
    the DC link capacitor of claim 9, and
    a discharge module which is arranged in the receptacle of the DC link capacitor.

11. An assembly for a vehicle driven by an electric motor, comprising:
    the DC link capacitor of claim 2, and
    a discharge module which is arranged in the receptacle of the DC link capacitor.

12. An assembly for a vehicle driven by an electric motor, comprising:
    the DC link capacitor of claim 1, and
    a discharge module which is arranged in the receptacle of the DC link capacitor.

13. The assembly of claim 12, wherein the discharge module comprises a printed circuit board, a discharge resistor fixed on the printed circuit board and/or a discharge switch fixed on the printed circuit board.

14. The assembly of claim 13, wherein the discharge module comprises a control line which extends from the discharge module to an outside of the DC link capacitor and which is arranged between two adjacent foil coils of the DC link capacitor.

15. The assembly of claim 12, wherein the discharge module comprises a control line which extends from the discharge module to an outside of the DC link capacitor and which is arranged between two adjacent foil coils of the DC link capacitor.

* * * * *